(12) United States Patent
Anand

(10) Patent No.: US 12,121,761 B2
(45) Date of Patent: Oct. 22, 2024

(54) SYSTEM AND METHOD FOR EARLY DETECTION AND MANAGEMENT OF WILDFIRES

(71) Applicant: Preet Anand, Oakland, CA (US)

(72) Inventor: Preet Anand, Oakland, CA (US)

(*) Notice: Subject to any disclaimer, the term of this patent is extended or adjusted under 35 U.S.C. 154(b) by 440 days.

(21) Appl. No.: 17/513,847

(22) Filed: Oct. 28, 2021

(65) Prior Publication Data

US 2022/0129681 A1   Apr. 28, 2022

Related U.S. Application Data

(60) Provisional application No. 63/106,533, filed on Oct. 28, 2020.

(51) Int. Cl.

| | |
|---|---|
| *A62C 3/02* | (2006.01) |
| *G06F 18/21* | (2023.01) |
| *G06V 20/13* | (2022.01) |
| *G06V 20/17* | (2022.01) |
| *G06V 20/52* | (2022.01) |
| *G08B 17/00* | (2006.01) |
| *G08B 27/00* | (2006.01) |

(52) U.S. Cl.
CPC .......... *A62C 3/0271* (2013.01); *G06F 18/217* (2023.01); *G06V 20/13* (2022.01); *G06V 20/17* (2022.01); *G06V 20/52* (2022.01); *G08B 17/005* (2013.01); *G08B 27/001* (2013.01)

(58) Field of Classification Search
CPC .... A62C 3/0271; G06F 18/217; G06V 20/13; G06V 20/17; G06V 20/52; G08B 17/005; G08B 27/001
See application file for complete search history.

(56) References Cited

U.S. PATENT DOCUMENTS

| 8,369,567 B1* | 2/2013 | Buck | G06V 20/13 |
| | | | 382/165 |
| 2021/0049789 A1* | 2/2021 | Bonn | G06V 20/52 |

\* cited by examiner

*Primary Examiner* — Casey L Kretzer
(74) *Attorney, Agent, or Firm* — Jubin Dana; Dana Legal Services

(57) ABSTRACT

A system and method are disclosed that allow for early detection and management of wildfires. According to various aspects and embodiments of the invention the system and method rapidly and economically detect and help manage and contain, control, suppress the progress of wildfires.

7 Claims, 4 Drawing Sheets

SYSTEM AND METHOD FOR EARLY DETECTION AND MANAGEMENT OF WILDFIRES

CROSS REFERENCE

This application claims the benefit of U.S. Provisional Patent application Ser. No. 63/106,533 filed on Oct. 28, 2020 and titled CAMERA AND ARTILLERY BASED METHOD FOR CONTROLLING WILDFIRES and naming inventor Preet ANAND, the entire disclosure of which is incorporated herein by reference.

FIELD OF THE TECHNOLOGY

The present invention is in the field of fire detection and management and, more specifically, system for early detection, control, and management of wildfires.

BACKGROUND

As the climate changes and the western United States experiences extremely dry weather conditions, wildfires are becoming more prevalent and widespread, consuming millions of acres of forests in one fire season. Seven million acres are burning annually. In perspective, which is approximately the size of Massachusetts or about sixteen percent of the land mass of California. In the past year (2020) hundreds of homes were destroyed, rendering many families homeless. The financial cost to society is staggering, including deploying fire crews try to contain and control wildfires and aircraft dropping tons of fire retardant on the fires. The non-financial costs are also high, including the destruction of much natural beauty usually enjoyed by hikers, campers, and hunters.

With dry conditions and high winds wildfires can spread almost exponentially. For example, the 2020 Glass Fire in California consumed 20 acres by 6:00 am on a Sunday morning. By 8:00 am, the fire had spread to 800 acres. Then, by 12:00 noon, the fire had consumed 1,000 acres. And by Monday at 8:00 am the Glass Fire was still growing after consuming 11,000 acres. Because of the very rapid spread of wildfires under dry, windy conditions, a rapid response is needed to extinguish the fire when it starts.

Current wildfire suppression strategy includes aircraft that drop fire suppressant on the flames and in the path of the fire. Firefighting crews are also dispatched by ground transport and by parachute. Therefore, what is needed is a system and method that monitors for wildfires that can deploy fire control measures, which will suppress or contain a wildfire upon fire detection.

SUMMARY

In accordance with various aspects and embodiments of the invention, a system and method are disclosed that monitor for and manage detected early wildfires, especially at early stages of the wildfire starting. The system and method deploy fire control measures, which will suppress or contain a wildfire upon fire detection. The system and method including accessing surveillance or monitoring devices, through a network access or delivery of images. The devices including a network of stationary cameras, satellite based cameras, roving drone based and/or balloon based cameras, any or all of which may be always-on cameras. In accordance with some embodiments, various sources of image and videos can be received, including images captured by drones or satellites controlled by state or government entities/employees.

One advantage is the ability to deploy fire containment, control, and suppression measures that cover large areas in any state, or other areas, where wildfires may occur. In accordance with some embodiments, the always-on cameras detect wildfires as soon as they are visible. In accordance with some embodiments, the images and/or video are provided from mobile cameras (drones, satellite, wireless devices). The images of the wildfire are sent to a processing system, where the exact location of the wildfire is determined. A unit for determining weather conditions, also inputs wind and humidity data from the wildfire location into the processing system. Once the exact location of the wildfire and the weather conditions at its site are determined, the processing system runs a decision algorithm to immediately determine if deploying fire retardant to (prepare the area, suppress, or contain) the wildfire is appropriate. If fire retardant deployment is appropriate, a mechanism for delivering fire retardant (military style artillery pieces) discharges shells filled with fire retardant into the path of, or onto, the targeted wildfire. One advantage of the invention is the time elapsed from initial fire detection to deployment of the fire retardant by artillery pieces is approximately ninety seconds. If the spread of wildfires can be slowed or stopped within ninety seconds of detection, many millions of dollars usually spent on fighting wildfire is significantly decreased. Also, millions of acres of prime forest and homes and businesses, are protected. Further, air quality and emissions degradation is mitigated.

BRIEF DESCRIPTION OF THE DRAWINGS

The invention is described in accordance with the aspects and embodiments in the following description with reference to the figures (FIGS.), in which like numbers represent the same or similar elements.

DETAILED DESCRIPTION

Figure 1:
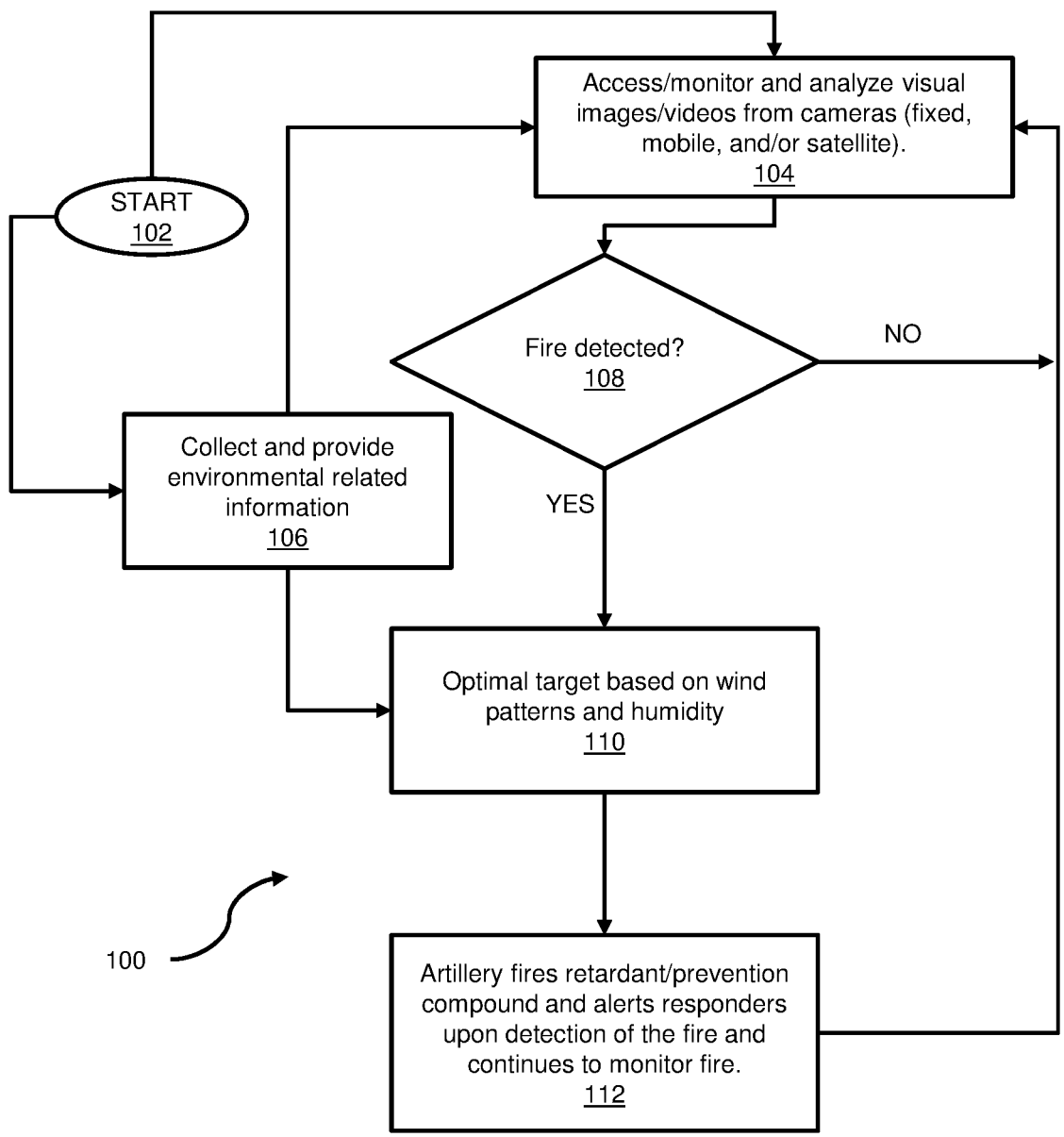
FIG. 1 shows a process for wildfire management and/or control in accordance with the various aspects and embodiments of the invention.

Reference throughout this specification to "one embodiment," "an example," "one example," "an embodiment," or similar language, means that a particular feature, structure, or characteristic described in connection with the various aspects of the invention may include in at least one embodiment of the invention. Thus, appearances of the phrases "in one embodiment," "in an embodiment," "in one example," "in certain embodiments," and similar language throughout this specification refer to the various examples of the invention and are used interchangeably. It is noted that, as used in this description, the singular forms "a," "an" and "the" include plural referents, unless the context clearly dictates otherwise. To the extent that the terms "including,"

"includes," "having," "has," "with," or variants thereof are used, in either the detailed description and the claims, such terms are intended to be inclusive in a similar manner to the term "comprising."

In the current disclosure, all examples provided are considered to be non-limiting example and are labeled "example" or "non-limiting example." The terms "wildfire control processing system," "control processing system" and "processing system" have the same meaning and are used interchangeably. The terms "wildfire" and "fire" have the same meaning. The terms "fire retardant," "pre-fire suppression," "pre-fire chemical," and "flame retardant" may be used interchangeably and include use of any chemical (including water) directly on a fire and use of any chemical in an area that is in the path of the fire in order to protect the environment (trees and ground covering) from damage, any of which can become fuel for the wildfire. The terms "mechanism for delivering fire retardant" and "artillery" have been used interchangeably. The terms "camera(s)" and "always-on camera(s)" are used interchangeably and include devices that capture images or video, such wireless handheld devices, drones, satellites, and spectral frequency specific cameras (such as light sensitive or heat sensitive cameras). The terms "unit to assess weather conditions," "environmental data collection unit," and "weather assessment unit" have been used interchangeable and includes the functions evident from the context, including any instruments that measures any environmental conditions, such as wind speed, temperature, humidity, etc.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Figure 2A:
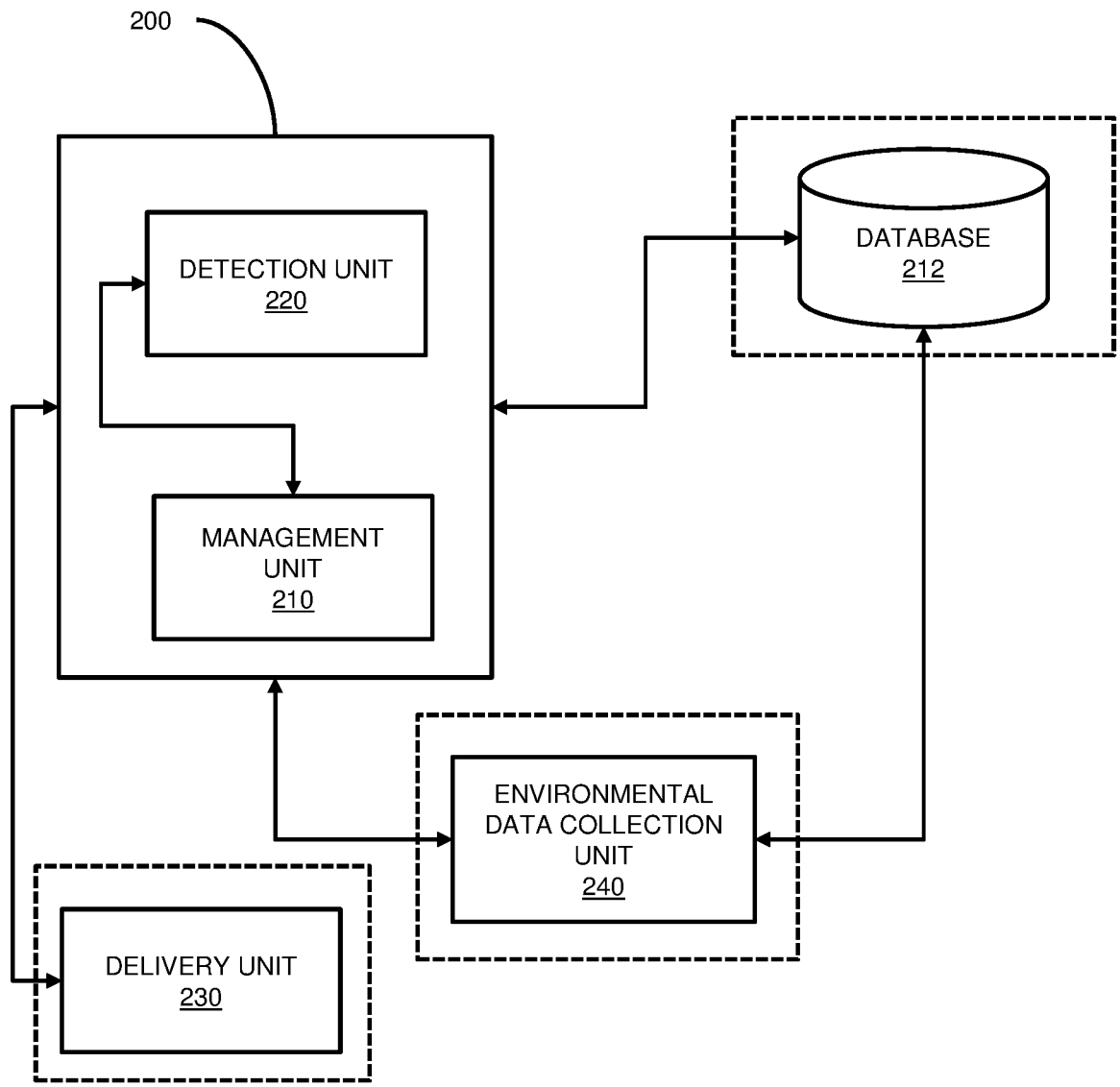
FIG. 2A shows a system for implementing the process of FIG. 1 in accordance with the various aspects and embodiments of the invention.
Figure 2B:
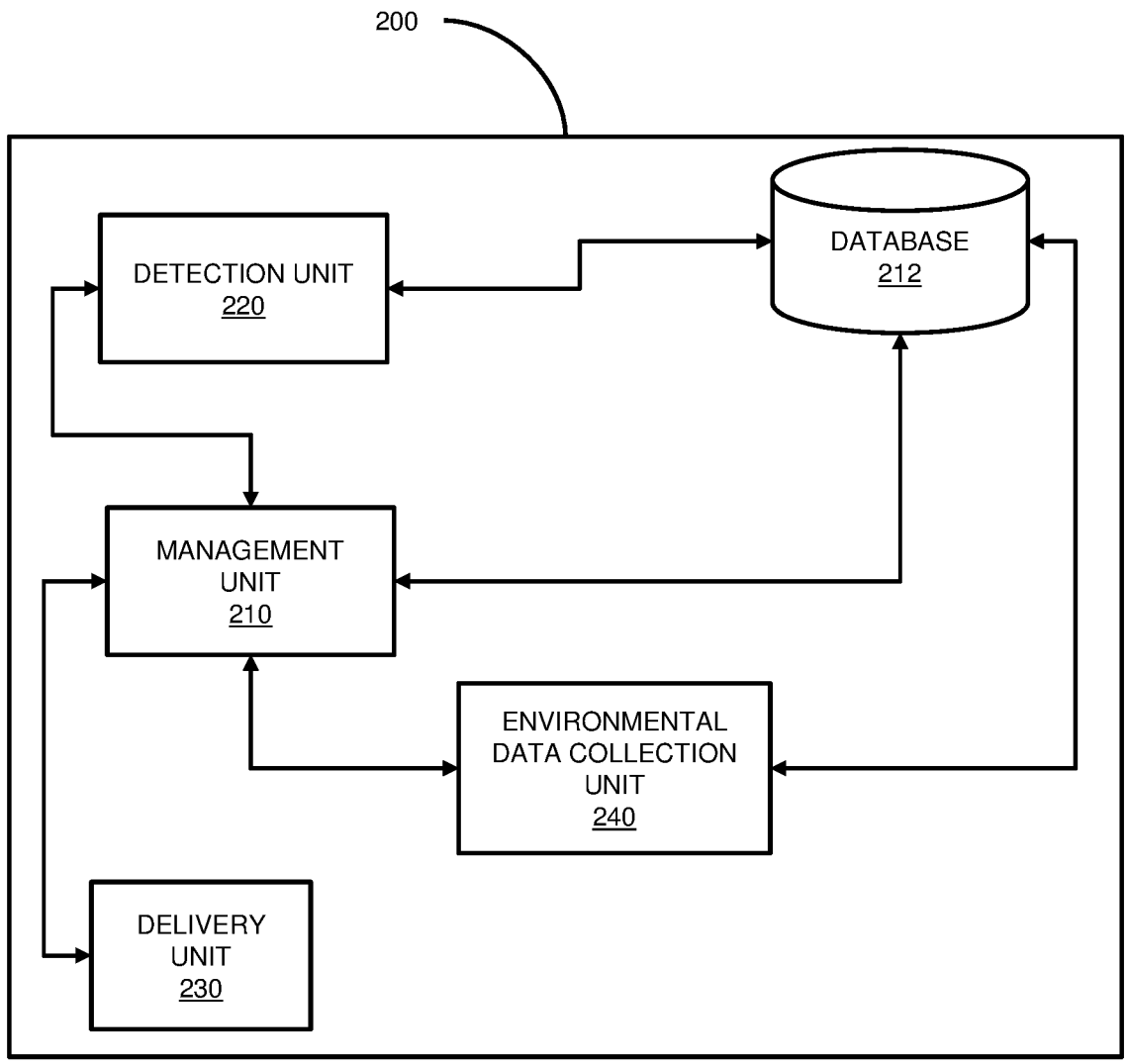
FIG. 2B shows a system for implementing the process of FIG. 1 in accordance with the various aspects and embodiments of the invention.

Now referring to FIG. 1, FIG. 2A and FIG. 2B, a process 100 is shown for detection and management of wildfires using a system 200, in accordance with the various aspects and embodiments of the invention. The process 100 begin at step 102. In accordance with various aspects of the invention, at step 104, the system 200 accesses images or video stored in a database 212. In accordance with various aspects of the invention, at step 104, the system 200 receive image or video delivered in real time. The system 200 also receives environmental information that is collected by an environmental data collection unit 240 and stored at step 106 in the database 212. In accordance with various aspects of the invention, the database 212 is local to the system 200's network. In accordance with various aspects of the invention the database 212 is at a remote location (represented by the dashed box) and accessed through a remote network connection, a remote wireless connection, or through the Internet (for example a cloud-based database).

In accordance with various aspects of the invention, at step 104, the system 200 is monitoring (in real-time) live feeds from cameras (including always-on cameras). At step 104, the system 200 analyzes the images or video content that is collected about wildfire location using the detection unit 220. In accordance with various aspects of the invention, at step 104, the detection unit 220 receives information in real time. In accordance with various aspects of the invention, at step 104, the detection unit access information stored in the database 212 for analysis.

In accordance with various aspects of the invention, the process begins at step 106; environment related information is accessed by or provided to the system 200 from the unit 240 and the process continues to step 104. In accordance with various aspects of the invention, the unit 240 is local to the system 200. In accordance with various aspects of the invention, the unit 240 is remotely located and access via remote connections as noted with respect to the database 212. In accordance with various aspects of the invention, the environmental information is continuously updated, which may be as requested by the system during the process. In accordance with various aspects of the invention, the environmental information is updated based on a timed bases, which can vary depending on if the system has detected the presence of a wildfire or if there is no wildfire detected.

In accordance with various aspects of the invention, the cameras can be deployed in satellites in orbit over any fire-prone area in the world. In accordance with various aspects of the invention, the cameras can also be deployed on fixed structures in and around wildfire-prone areas. In accordance with various aspects of the invention, the camera platforms include, but are not limited to, roving drones and hot-air balloons.

As step 104, the system 200 received images along with location information about each image, which includes coordinates. Thus, the system 200 use the images to determine a potential target location for fire retardant delivery, if the system 200 determines a wildfire is present at the location. At step 108, the system 200 determines if a fire is located. If not, then the system 200 continues to monitor and analyze incoming images at step 104. If a fire is detected, then the process continues to step 110. At step 110, the system 200 retrieves and/or receives the most current weather conditions (from the unit 240 at step 106) for the location associated with the image. The unit 240 (collects and assesses weather conditions, such as wind patterns and humidity levels at the location of the wildfire) instantly transmits the weather conditions to a managing unit 210 or the detection unit 220 of the system 200. The data determining the exact wildfire location, direction, and its wind and humidity conditions are combined to determine if an immediate command is to be sent to a delivery unit 230. The delivery unit 230 can delivery artillery pieces, or other mechanisms for delivering fire retardant chemicals or pre-fire control retardant/suppression chemicals.

In addition to traditional fire retardants/chemicals being currently used that do not adhere to vegetation or can harm the environment, the current system 200 can deploy newer fire retardants that stick to vegetation prior to or pre-fire arrival, thereby making the vegetation in the path of the fire for resistant to burning. The advantage of these types of fire retardant is that they are environmentally friendly and bio-degradable, which does not harm the vegetation or the environment.

In accordance with various aspects and embodiments of the invention, the fire artillery shells are filled with flame retardant chemicals/compounds as discussed herein. The content is delivered unto or in the direct path of the targeted wildfire. At step 112, after a wildfire target is selected for flame retardant delivery, the system 200 signal the delivery unit 230 to being artillery firing in order to deliver the flame retardant shells; this happens within seconds as fast response time is essential. For a non-limiting example, the artillery shells are fired within 30 seconds. In accordance with various aspects and embodiments of the invention, the time from initial fire detection by the cameras to the firing of the artillery including the flame retardant filled artillery shells is approximately 90 seconds.

The system 200's early detection also allows for communication to the responders to allow them to take control and containment measures. For example, responders will have more time to prepare the land or clear the land to slow to control the progress of the fire. The additional time allowed by the early detection provided by the system 200 will also provide greater time for responders to evaluate populated areas that are in the path of the fire.

In accordance with various aspects and embodiments of the invention, the artillery commonly used shoots projectiles over ten miles at a rate of 2 to 8 rounds per minute. Once a confirmed, high-risk wildfire target is selected, a significant amount of fire retardant is delivered onto it or in its path within a short period of time.

After each artillery shell fires unto a targeted wildfire the system 200 initiates continuous monitoring of the wildfire at step 104. Additional images are analyzed. The fire location is updated with new wildfire location coordinates, which are sent to the system 200. The unit 240 assess weather conditions 110 simultaneously and sends wind speed and humidity information (at the wildfire site) to the processing system 104. The system 200 immediately sends adjusted artillery coordinates and fire-retardant projectile firing rate to the delivery unit 230. The fire-retardant projectile firing rate and trajectory can be adjusted to match the wildfire's progress, for example every ten seconds. The camera(s) continues to monitor the selected target wildfire to continuously detect its course. Wind patterns and humidity levels at the site of the wildfire are also continuously monitored by the unit 240. The location and movement data for the wildfire along with the weather conditions at the wildfire site are continuously fed into the management unit 210, either to control the delivery unit 230, which will continue to fire additional fire-retardant into the wildfire, onto its path, or to stop firing once the wildfire is contained, under control, or emergency services deem it appropriate.

Figure 3:
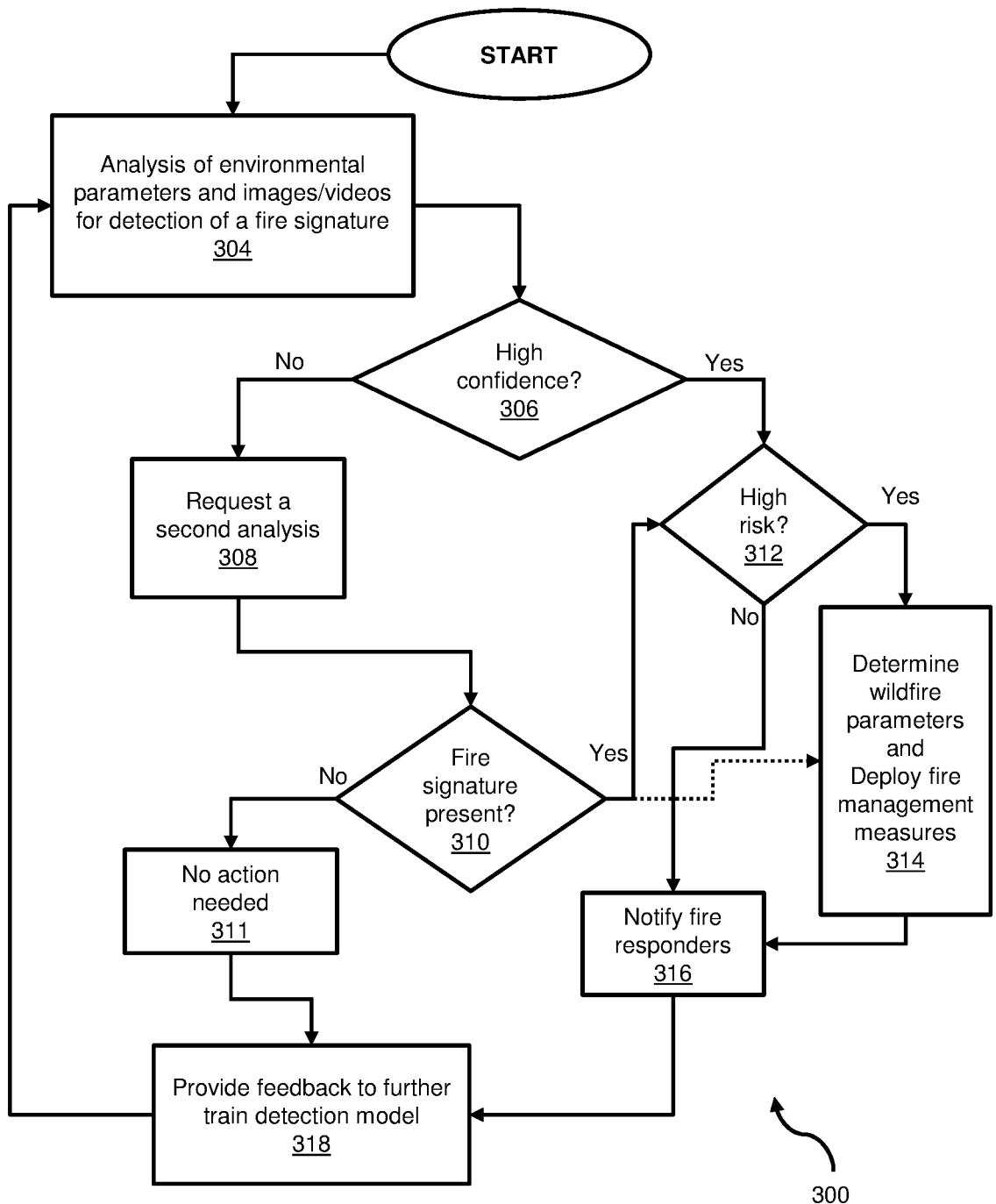
FIG. 3 shows a process for analysis of information to determine if a wildfire exists, which requires management and/or control, in accordance with the various aspects and embodiments of the invention.

Now referring to FIG. 2A, FIG. 2B, and FIG. 3, a process 300 is shown for analysis of images or video to determine a fire signature, according to various aspects and embodiments of the invention. The process 300 is executed using a non-transitory computer readable medium and includes a process for determining when the system 200 should deploy fire respondents, fire containment/control measures, and/or delivery of flame-retardant or fire control projectiles into a wildfire or in the path of the wildfire. The non-transitory computer readable medium also includes code, which when executed by a processor, causes the system 200 to analyze wildfire images and generate feedback to further train and improve an artificial intelligence (AI) model.

The process starts at step 304 and the system 200 analyzes wildfire images along with environmental information, which are transmitted to or accessed by the system 200. At step 304, the detection unit 220 (of the system 200) uses a trained AI model to scan the images/videos for a wildfire signature. At step 306, the system 200 determines if the wildfire signature detected is likely to a wildfire and assigns a confidence rating score to the image. If the confidence rating score assigned to the image is above a threshold value, which is a high confidence rating score, then at step 312 the system 200 determines if the wildfire signature is a high risk situation that requires immediate attention. If the rating score is high and the image represents an immediate danger, then the process continues to step 314. At step 314, the management unit 210 determines the wildfire parameters, such as the size of the wildfire, estimated path of the wildfire, population density near or in the path of the wildfire, type of fuel the wildfire is consuming, weather conditions, other risk factors, and confidence rating score for the wildfire signature in the image. At step 314, the management unit 210 (of the system 200) also determines if the wildfire signature (with a high confidence rating score) is high-risk wildfire, for example to human life or property. If the system 200 determines that the wildfire is a high-risk wildfire, then the management unit 210 send a control signal to delivery unit 230 to begin delivery (firing artillery) of flame retardant projectiles unto the wildfire or in the path of the wildfire. At step 316, the system 200 (the management unit 210) notifies wildfire responders. The process 300 continues to step 318, wherein feedback is provided to the detection unit 220, which is used to update and train the AI model.

If the system 200 determines a wildfire signature detected in an image has a low confidence rating score, then at step 308 the system 200 alerts a control center or user monitoring. The system 200 requests a second analysis or review of the image. If at step 310, the user performing the second review of the image determines a wildfire signature is not present, then the user provides input to the management unit 210 indicating that no action is needed; the image is tagged appropriately (either by the user or the system 200). If the manual review determines that there is no wildfire signature is present, the command to fire flame retardant projectiles is not given and traditional wildfire responders are not notified. The manual review of the image with a questionably confidence rating score is also used to refine the system's 200 image processing AI models. Accordingly, the process 300 continues to step 318, where feedback (the tagged image after the manual review) is provided to the system 200 and/or the detection unit 220. This feedback is used to update and further train the AI model.

If at step 310 the user determines that a wildfire signature is present, then the user provides input to the system 200 or the management unit 210 that a wildfire signature is present. For example, the user may update the confidence rating score to be above the threshold, thereby allowing the system 200 to move to risk analysis step 312. Either the user or the system 200 assigns an updated or revised confidence rating score to the image, which score is high to indicate that there is a fire signature and hence a wildfire present/active. The process continues to step 312 and the system 200, as outlined above, determines the risk (high or low) assessment as detailed above. In accordance with some aspects and embodiments of the invention, the user can, at step 310 also assign a risk assessment score to expedite the process and allow the system 200 to immediately move to step 314, as shown by the dashed-path from step 310 to step 314. The process 300 continues to step 318, wherein feedback is provided to the detection unit 220 to update and further train the AI model.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention is embodied by the appended claims.

What is claimed is:

1. A wildfire control system comprising:
   a management unit; and
   a detection unit in communication with the management unit, wherein the detection unit monitors for and analyzes images in an ongoing process to determine if a wildfire signature of a wildfire is present and assigns a confidence rating score to each analyzed image,
   wherein the management unit receives input from the detection unit identifying a wildfire signature in an analyzed image that is assigned a confidence rating score,
   wherein the management unit requests addition review of the analyzed image if the assigned confidence rating score is below a threshold,
   wherein the management unit determines a risk assessment for the analyzed image if the assigned confidence rating score is equal to or above the threshold,
   wherein the management unit determines other actions that need to be taken to contain the wildfire, including alerting emergency responders, and
   wherein the detection unit continues monitoring and analyzing after an action is taken or a review is requested.

2. The system of claim 1 further comprising a database in communication with the management unit and the detection unit, wherein the database stores images and video content captured by a camera.

3. The system of claim 1 further comprising an environmental data collection unit in communication with the management unit for providing environmental information for the analyzed image.

4. The system of claim 3, wherein the environmental information includes at least one of weather conditions, location information, humidity, and fuel in a path of the wildfire.

5. The system of claim 1 further comprising a delivery unit for delivering fire retardant to a location associated with the wildfire, wherein the delivery unit is in communication with the management unit.

6. A method for early detection of wildfires, the method comprising:
   analyzing a plurality of images;
   assigning a confidence rating score to each of the plurality of analyzed images based on if a wildfire signature is present;
   determining if any confidence rating score for any one of the plurality of analyzed images is below a threshold;
   requesting a second review of a selected analyzed image with a confidence rating score below the threshold to determine if a wildfire signature is present in the selected analyzed image;
   determining, when the second review confirms the wildfire signature represents that a wildfire is present in the selected analyzed image, if the wildfire is a high-risk wildfire;
   collecting parameters for a determined high-risk wildfire; and
   deploying fire retardant measures using the parameters in order to manage the determined high-risk wildfire.

7. A non-transitory computer readable medium for storing code, which code is executed by a processor and causes a system to:
   analyze images to determine if a wildfire signature for a wildfire present in any of the images;
   assign a confidence rating score to each analyzed image based on if a wildfire signature is present;
   request a second analysis of any analyzed image when the confidence rating score is below a threshold;
   determine a risk assessment for any analyzed image when the confidence rating score is equal to or above the threshold;
   deploy fire retardant measures onto the wildfire at the wildfire's location to provide an immediate response to the wildfire when the confidence rating score is equal to or above the threshold and the risk assessment is high; and
   alert fire responders with location information and environmental conditions for the wildfire onto which fire retardant measures are deployed.

* * * * *